United States Patent
Mossoba et al.

(10) Patent No.: US 10,223,875 B1
(45) Date of Patent: Mar. 5, 2019

(54) METHODS AND DEVICES FOR AUTOMATIC TRANSACTION MACHINES FOR RECOGNIZING SURROUNDINGS

(71) Applicant: Capital One Services, LLC, McLean, VA (US)

(72) Inventors: Michael Mossoba, Arlington, VA (US); Abdelkader Benkreira, Washington, DC (US); Joshua Edwards, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/113,091

(22) Filed: Aug. 27, 2018

(51) Int. Cl.
   *G07F 19/00* (2006.01)
   *G06Q 20/10* (2012.01)
(52) U.S. Cl.
   CPC ....... *G07F 19/207* (2013.01); *G06Q 20/1085* (2013.01)
(58) Field of Classification Search
   CPC .................................................... G07F 19/207
   USPC ......................................................... 705/43
   See application file for complete search history.

(56) References Cited

U.S. PATENT DOCUMENTS

| | | | |
|---|---|---|---|
| 5,519,669 A | 5/1996 | Ross et al. | |
| 5,731,575 A | 3/1998 | Zingher et al. | |
| 5,995,847 A | 11/1999 | Gergen | |
| 9,027,077 B1* | 5/2015 | Bharali | H04L 63/02 726/1 |
| 2002/0038818 A1 | 4/2002 | Zingher et al. | |
| 2008/0075235 A1* | 3/2008 | Russikoff | G07F 19/20 379/45 |
| 2015/0115027 A1* | 4/2015 | Carpenter | G07F 19/203 235/379 |
| 2017/0352015 A1* | 12/2017 | Xu | G06Q 20/1085 |

* cited by examiner

*Primary Examiner* — Jessica Lemieux
(74) *Attorney, Agent, or Firm* — Finnegan, Henderson, Farabow, Garrett & Dunner LLP (57) ABSTRACT

A method for enhancing automated transaction machine (ATM) security surveillance. The method consists of receiving a set of data from a financial device and generating a template for the financial device. The method generates an analysis by analyzing a portion of the received set of data. The method then determines a likelihood factor that the analyzed first portion is associated with a security threat, wherein if the likelihood factor is above a threshold then the method generates a second analysis by analyzing a second portion of the received first set of data and revises the likelihood factor based on the second analysis. The method generates a notice if the first likelihood factor exceeds a second threshold and then updates the template with the analysis and the likelihood factor and receives a second set of data from the monitoring device. The method updates the template with the second set of data.

20 Claims, 5 Drawing Sheets

METHODS AND DEVICES FOR AUTOMATIC TRANSACTION MACHINES FOR RECOGNIZING SURROUNDINGS

TECHNICAL FIELD

The present disclosure generally relates to methods, systems, and devices for enhanced automated transaction machine (ATM) security surveillance.

BACKGROUND

ATM devices often attract danger due to the nature and access to fiat currencies. Thus, to deter this danger, ATMs generally include security and surveillance features and devices.

There is generally a need to further secure areas around ATMs. Thus ATMs are consistently upgraded with security features. It is possible to double purpose these features for further securing the surrounding environment around an ATM. While some solutions currently exist for securing the ATM itself, this is inefficient and only useful for a limited location range around the ATM.

Typically, security surveillance of unguarded sites for burglary, vandalism or other unlawful activity, or for augmenting protection of guarded sites, includes taking video camera images of site activity and transmitting the images to a remote central monitoring point. A human observer, who periodically inspects an array of video displays of multiple sites detects an actionable incident or event at the site. But, because of fatigue and other factors, the chances of the observer failing to notice an incident are substantial.

The present disclosure provides systems, methods, and devices to solve these and other security problems.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of a processor bracket and, it is to be understood that the disclosed embodiments are not limited to any particular industry.

Disclosed embodiments include a method for enhancing automated transaction machine (ATM) security surveillance. The method consists of receiving a first set of data from a financial device. The method further consists of generating a template for the financial device, where the template comprises the received first set of data. The method stores the template. The method further generates a first analysis by analyzing a first portion of the received first set of data. The method then determines a first likelihood factor that the analyzed first portion is associated with a security threat, wherein if the first likelihood factor is above a first threshold then the method generates a second analysis by analyzing a second portion of the received first set of data and revises the first likelihood factor based on the second analysis. The method further generates a first notice if the first likelihood factor exceeds a second threshold. The method then updates the template with the first analysis and the first likelihood factor. Then the method receives a second set of data from the monitoring device. And the method then updates the template with the second set of data.

It is to be understood that both the foregoing general description and the following detailed description are exemplary and explanatory only, and are not restrictive of the disclosed embodiments, as claimed.

BRIEF DESCRIPTION OF DRAWINGS

The accompanying drawings, which are incorporated in and constitute a part of the specification, illustrate several embodiments and, together with the description, serve to explain the disclosed principles. In the drawings.

DETAILED DESCRIPTION

An initial overview of machine learning is first provided immediately below and then specific exemplary embodiments of systems, methods, and devices for enhancing ATM security surveillance are described in further detail. The initial overview is intended to aid in understanding some of the technology relevant to the systems, methods, and devices disclosed herein, but it is not intended to limit the scope of the claimed subject matter.

In the world of machine prediction, there are two subfields—knowledge-based systems and machine-learning systems. Knowledge-based approaches rely on the creation of a heuristic or rule-base which is then systematically applied to a particular problem or dataset. Knowledge-based systems make inferences or decisions based on an explicit "if-then" rule system. Such systems rely on extracting a high degree of knowledge about a limited category to virtually render all possible solutions to a given problem. These solutions are then written as a series of instructions to be sequentially followed by a machine.

Machine learning, unlike the knowledge-based programming, provides machines with the ability to learn through data input without being explicitly programmed with rules. For example, as just discussed, conventional knowledge-based programming relies on manually writing algorithms (i.e. rules) and programming instructions to sequentially execute the algorithms. Machine learning systems, on the other hand, avoid following strict sequential programming instructions by making data-driven decisions to construct their own rules. The nature of machine learning is the iterative process of using rules, and creating new ones, to identify unknown relationships to better generalize and handle non-linear problems with incomplete input data sets. A detailed explanation of one such machine learning technique is disclosed in the article: Michalski, R. S., Stepp, R. E. "Learning from Observation: Conceptual Clustering," Chapter 11 of Machine Learning: an Artificial Intelligence Approach, eds. R. S. Michalski, J. G. Carbonell and T. M. Mitchell, San Mateo: Morgan Kaufmann, 1983.

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments relate to systems and methods for utilizing data to enhance an ATM security surveillance. While some solutions currently exist for securing the ATM itself, this is inefficient and only useful for a limited location range around the ATM. Furthermore, current solutions do not effectively utilize machine learning to properly analyze the abundance of surveillance data around ATMs to improve security and the safety of the community.

There exist substantial untapped security data sources that may be utilized to provide improved ATM and community security. Sentient, voice, and image recognition software has progressed such that simple audio/video data files can be streamed and analyzed by machine learning software to detect threats. And with the expansive range of modern sensors (such as cameras and audio recorders), and the dispersed nature of ATMs, ATMs can further provide security for the community at large. The disclosed embodiments below describe the formation and modification of financial device templates to further improve the accuracy and speed of machine-learning analysis, as well as, improve the response time of first responders in the case of determined danger. The embodiments disclosed below utilize machine learning to provide enhanced security of the ATM itself, but also the surrounding community as well.

The following description provides examples of systems, methods, and devices for enhancing ATM security surveillance. The arrangement of components shown in the figures is not intended to limit the disclosed embodiments, as the components used in the disclosed systems may vary.

Figure 1:
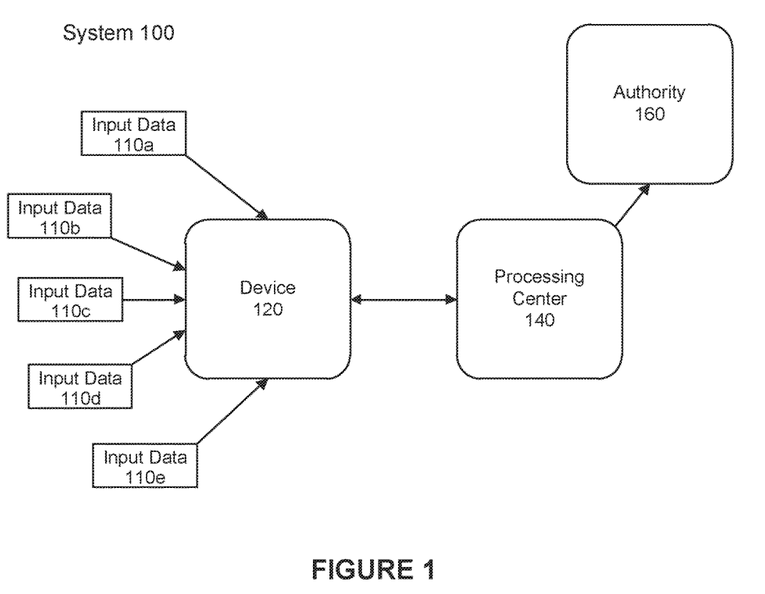
FIG. 1 is a block diagram of an exemplary enhanced ATM security surveillance system, consistent with disclosed embodiments.

FIG. 1 illustrates an exemplary enhanced ATM security surveillance 100 system. In any given environment, input data 110a-110e is ripe for monitoring by device 120. Device 120 may exist in any type of environment, either having open doors or with closed doors, and it may generally provide a means for users to interact with their banks and bank accounts. And likewise, device 120 may receive input data 110a-110e from a single source or from multiple surrounding sources. Input data 110a-110e may be video data, audio data, or biometric data. The enhanced ATM security surveillance 100 system may receive several types of inputs, for example, audio recordings 110a, video recordings 110b, biometric scans 110c, mobile device communication 110d, and even input through a user interface 110e. Data 110a-110e received by device 120 may be altered, using various combinations, and the system is not limited to the data illustrated in FIG. 1.

A user attempting to access their bank account may attempt to access the account through device 120, for example, an ATM. In certain embodiments, device 120 may include a power supply, such as a battery, configured to provide electrical power to one or more components of device 120, such as processor, a memory, and a communication device.

In addition to functioning as an ATM, i.e. providing user access to financial institutions and their banking accounts, device 120 may further communicate with processing center 140. Communication between device 120 and processing center 140 may occur through various means through a network. Appropriate forms of communication include near-field communication (NFC), Wi-Fi, Bluetooth, cellular, and/or other such forms of wireless communication, as well as wired communication, discussed herein. Device 120 may communicate the received input data 110a-110e to processing center 140 for further processing and analysis.

Once received, processing center 140 may further analyze input data 110a-110e through the means described herein. Additionally, processing center 140 may further analyze data from a plurality of financial devices 120. For example, processing center 140 may process input data 110a-110e with any of the above machine learning methods previously discussed. Alternatively, processing center 140 may create a template for the input data 110a-110e received at an initial time. Processing center 140 may further store initial input data 110a-110e and analyze it to determine whether there is a likelihood that input data 110a-110e is associated with a security threat if input data 110a-110e indicates, above a threshold, that there is a security threat. The security threat may be to a specific user interacting with device 120, or processing center 140 may determine that there is a security threat to the general surroundings of device 120. For example, the user may shout for help, or processing center 140 may determine that the user is under distress from an assailant. The security threat may be for device 120 itself, e.g. an individual is attempting to vandalize, break into, destroy, etc. device 120; or alternatively, the security threat may be for the environment, e.g. a flash flood threatens the area, a fire is raging near by, an actual tornado sighting, etc. Processing center 140 may use sentiment analysis to determine if there is a security threat by analyzing particular sounds or key phrases, i.e. "help-help." Alternatively, processing center 140 may analyze additional auditory triggers, such as gunshots or the volume and inflection of user's voices. This analysis may be conducted as an alternative to or in conjunction with the sentiment analysis. Processing center 140 may use video recognition to determine a security threat through facial recognition of a wanted criminal, an amber alert child, or even detecting significant heat (infrared) from a nearby fire.

After further analysis, processing center 140 may transmit instructions back to device 120. In some embodiments, processing center 140 may instruct device 120 to sound an alarm and may signal that appropriate authority first responders are on their way. Additionally, processing center 140 may also transmit alerts to authority 160. Authority 160 may include any security personnel or system designed to respond to threats such as the fire department, police, ambulance, security, any first responder, etc. Processing center 140 may transmit necessary input data 110a-110e required by authority 160 to respond appropriately. Processing center 140 may communicate with authority 160 via any appropriate forms of communication including near-field communication (NFC), Wi-Fi, Bluetooth, cellular, and/or other such forms of wireless communication, as well as wired communication, discussed herein. Additionally, processing center 140 may maintain an open communication connection with authority 160 and provide one or more live streams of input data 110a-110e. Authority 160 may be associated with device 120 (i.e. security for a financial service provider) or it may be associated with a third party.

Figure 2:
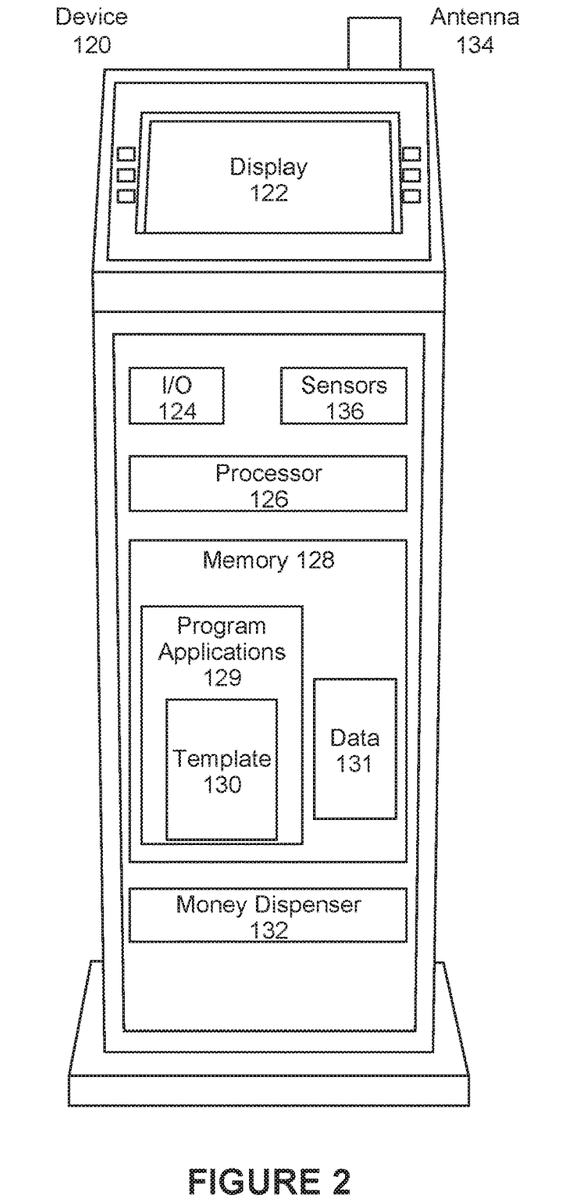
FIG. 2 is a diagram of an exemplary financial device, consistent with disclosed embodiments.

FIG. 2 illustrates an exemplary configuration of device 120, consistent with disclosed embodiments. Various types of financial devices 120, such as an ATM, a bank drive-through window, a vending machine, etc. may be implemented in system 100. As shown, device 120 may include a display 122, an input/output ("I/O") device 124, one or more processors 126, and a memory 128 having stored therein one or more program applications 129, such as template 130, and data 131. Device 120 may also include a money dispenser 132. Device 120 may also include antenna 134 and one or more sensors 136. Display 122, I/O devices 124, processor(s) 126, memory 128, antenna 134, or sensor(s)

136 may be connected to one or more of the other devices depicted in FIG. 1, such as to processing center 140, or even to another device 120. Such connections may be accomplished using a bus or other interconnecting device(s).

Processor 126 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 126 may constitute a single core or multiple core processors that executes parallel processes simultaneously. For example, processor 126 may be a single core processor configured with virtual processing technologies. In certain embodiments, processor 126 may use logical processors to simultaneously execute and control multiple processes. Processor 126 may implement virtual machine technologies, or other known technologies to provide the ability to execute, control, run, manipulate, store, etc., multiple software processes, applications, programs, etc. In another embodiment, processor 126 may include a multiple-core processor arrangement (e.g., dual, quad core, etc.) configured to provide parallel processing functionalities to allow device 120 to execute multiple processes simultaneously. One of ordinary skill in the art would understand that other types of processor arrangements could be implemented that provide for the capabilities disclosed herein.

I/O devices 124 may include one or more devices that allow financial device 120 to receive input from a user and provide feedback to the user. I/O devices 124 may also include one or more devices that allow device 120 to monitor input from the surrounding environment. I/O devices 124 may include, for example, one or more buttons, switches, speakers, microphones, video cameras, infrared scanners, biometric scanners, styluses, or touchscreen panels. In some embodiments, I/O devices 124 may be manipulated by the user to input information into device 120.

Memory 128 may be a volatile or non-volatile, magnetic, semiconductor, tape, optical, removable, non-removable, or other type of storage device or tangible (i.e., non-transitory) computer-readable medium that stores one or more program applications 129 such as template 130, and data 131. Data 131 may include, for example, user personal information, account information, display settings and preferences, financial device information, or recorded data from I/O devices 124. In some embodiments, account information may include items such as, for example, an alphanumeric account number, account label, account balance, account issuance date, account expiration date, account issuer identification, a government ID number, and any other necessary information associated with a user and/or an account associated with a user, depending on the needs of the user, and/or entities associated with system 100.

Program application 129 may include operating systems (not shown) that perform known operating system functions when executed by one or more processors. By way of example, the operating systems may include any of Microsoft Windows™, Unix™, Linux™ Apple™, or Android™ operating systems, Personal Digital Assistant (PDA) type operating systems, such as Microsoft CE™, or other types of operating systems. Accordingly, disclosed embodiments may operate and function with computer systems running any type of operating system. Device 120 may also include communication software that, when executed by processor 126, may provide communications with a network. Device 120 may be a device that executes applications for performing operations consistent with disclosed embodiments. For example, device 120 may be an ATM, a vending machine, a kiosk, or may be a device such as a PDA, a cell phone, a tablet, a computer, etc.

Program applications 129 may include template 130, which may be a template for monitoring security threats consistent with the machine learning processes described herein. In some embodiments, application 129 may include instructions that cause processor 126 to connect with a network and processing center 140.

Device 120 may also store, in memory 128, data 131 relevant to the examples described herein for system 100. One such example is the storage of user identifying information like a username/pas sword, user biometric data, etc. or user account information. Data 131 may contain any data discussed above relating to the historical data processed for security threats. Data 131 may be further associated with information for a particular user.

Sensors 136 may include one or more devices capable of sensing the environment around device 120, and/or sensing data gathered by input/output 124 devices. In some embodiments, sensors 136 may include, for example, a position sensor, a physical pressure sensor, a microphone, a camera, an ambient light sensor, an infrared sensor, a temperature sensor, a gas sensor (to detect combustible or toxic gases), and/or a conductivity sensor. In addition, sensors 136 may include devices for detecting location via systems such as a Global Positioning System (GPS), a radio frequency triangulation system based on cellular or other such wireless communication, and/or other systems for determining the location of device 120.

Antenna 134 may include one or more devices capable of communicating with a network. One such example includes an antenna wirelessly communicating with a network via cellular data or Wi-Fi. Although communication between device 120 and a network and/or processing center 140, may be shown as wireless communication, such communication could also occur using wired communication via, for example, an Ethernet terminal (not shown).

The network may comprise any type of computer networking arrangement used to exchange data. For example, the network may be the Internet, a private data network, local area network (LAN), wide area network (WAN), virtual private network (VPN) using a public network, and/or other suitable connection(s) that enables system 100 to send and receive information between the components of system 100. In some embodiments, the network may include a public switched telephone network ("PSTN") and/or a wireless network such as a cellular network, WiFi network, or other known wireless network capable of bidirectional data transmission. In other embodiments, the network may include any local computer networking used to exchange data in a localized area, such as WiFi, Bluetooth™, Ethernet, Radio Frequency, and other suitable network connections that enable components of system 100 to interact with one another.

Money dispenser 132 may be a mechanical means for providing currency to a user as provided in a typical ATM. Further, device 120 may have access to a limited amount of fiat currency in order to dispense to users based on their interactions with the device 120.

In certain embodiments, device 120 may include a power supply, such as a battery (not shown), configured to provide electrical power to device 120. It is contemplated that power supply may include any power supplied from an external power grid, an electrical generator set, or any other power supply known in the art.

Figure 3:
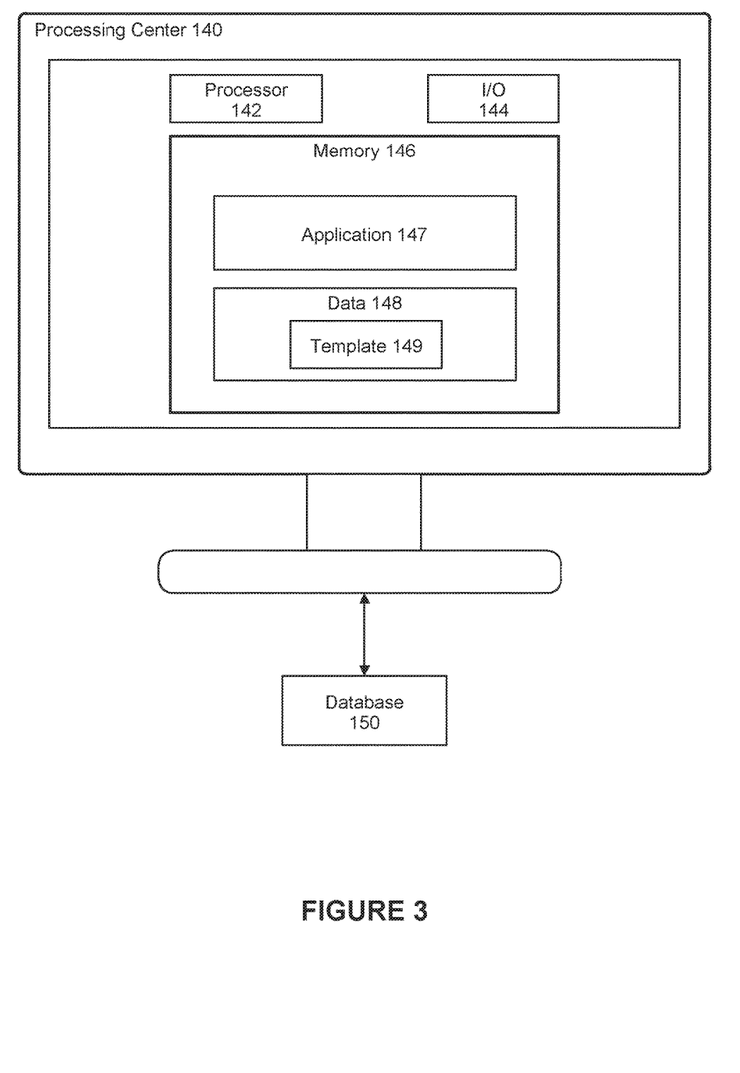
FIG. 3 is a diagram of an exemplary processing center, consistent with disclosed embodiments.

FIG. 3 shows an exemplary configuration of processing center 140 consistent with disclosed embodiments. Processing center 140 may be associated with a financial service provider, a merchant, a vendor, a bank, or any other entity that maintains a user account. In one embodiment, processing center 140 may optionally include one or more processors 142, one or more input/output (I/O) devices 144, and one or more memories 146. In some embodiments, processing center 140 may take the form of a server, general purpose computer, mainframe computer, or the like. In other embodiments, processing center 140 may take the form of a mobile computing device such as a smartphone, tablet, laptop computer, or the like. Alternatively, processing center 140 may be configured as a particular apparatus, device, dedicated circuit, or the like, based on the storage, execution, and/or implementation of the software instructions that perform one or more operations consistent with the disclosed embodiments. Additionally, processing center 140 may be a physical facility associated with the financial service provider, merchant, vendor, or any other entity that maintains a user account.

Processor(s) 142 may include one or more known processing devices, such as mobile device microprocessors, desktop microprocessors, server microprocessors, or the like. For instance, processor 142 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 142 may constitute a single core or multiple core processors that executes parallel processes simultaneously. For example, processor 142 may be a single core processor configured with virtual processing technologies. In certain embodiments, processor 142 may use logical processors to simultaneously execute and control multiple processes. Processor 142 may implement virtual machine technologies, or other known technologies to provide the ability to execute, control, run, manipulate, store, etc., multiple software processes, applications, programs, etc. In another embodiment, processor 142 may include a multiple-core processor arrangement (e.g., dual, quad core, etc.) configured to provide parallel processing functionalities to allow processing center 140 to execute multiple processes simultaneously. One of ordinary skill in the art would understand that other types of processor arrangements could be implemented that provide for the capabilities disclosed herein. The disclosed embodiments are not limited to a particular type of processor.

I/O devices 144 may be one or more devices configured to allow data to be received and/or transmitted by processing center 140. I/O devices 144 may include one or more digital and/or analog devices that allow processing center 140 to communicate with other machines, devices, and systems, such as other components and devices of system 100. For example, I/O devices 144 may include a screen for displaying messages to a user (such as a customer, a retail venue manager, a bank manager, or a financial service provider employee). I/O devices 144 may also include one or more digital and/or analog devices that allow a user to interact with system 100, such as a touch-sensitive area, keyboard, buttons, or microphones. I/O devices 144 may also include other components known in the art for interacting with a user. I/O devices 144 may also include one or more hardware/software components for communicating with other components of system 100. For example, I/O devices 144 may include a wired network adapter, a wireless network adapter, a cellular network adapter, or the like. Such network components enable processing center 140 to communicate with other devices of system 100 to send and receive data.

Memory 146 may include one or more storage devices configured to store instructions usable by processor 142 to perform functions related to the disclosed embodiments. For example, memory 146 may be configured with one or more software instructions, such as one or more program applications 147 that perform one or more operations when executed by processor 142. The disclosed embodiments are not limited to separate programs or computers configured to perform dedicated tasks. For example, memory 146 may include a single program or multiple programs that perform the functions of device 120 or processing center 140. Memory 146 may also store data 148 that is used by the one or more applications 147.

Figure 4:
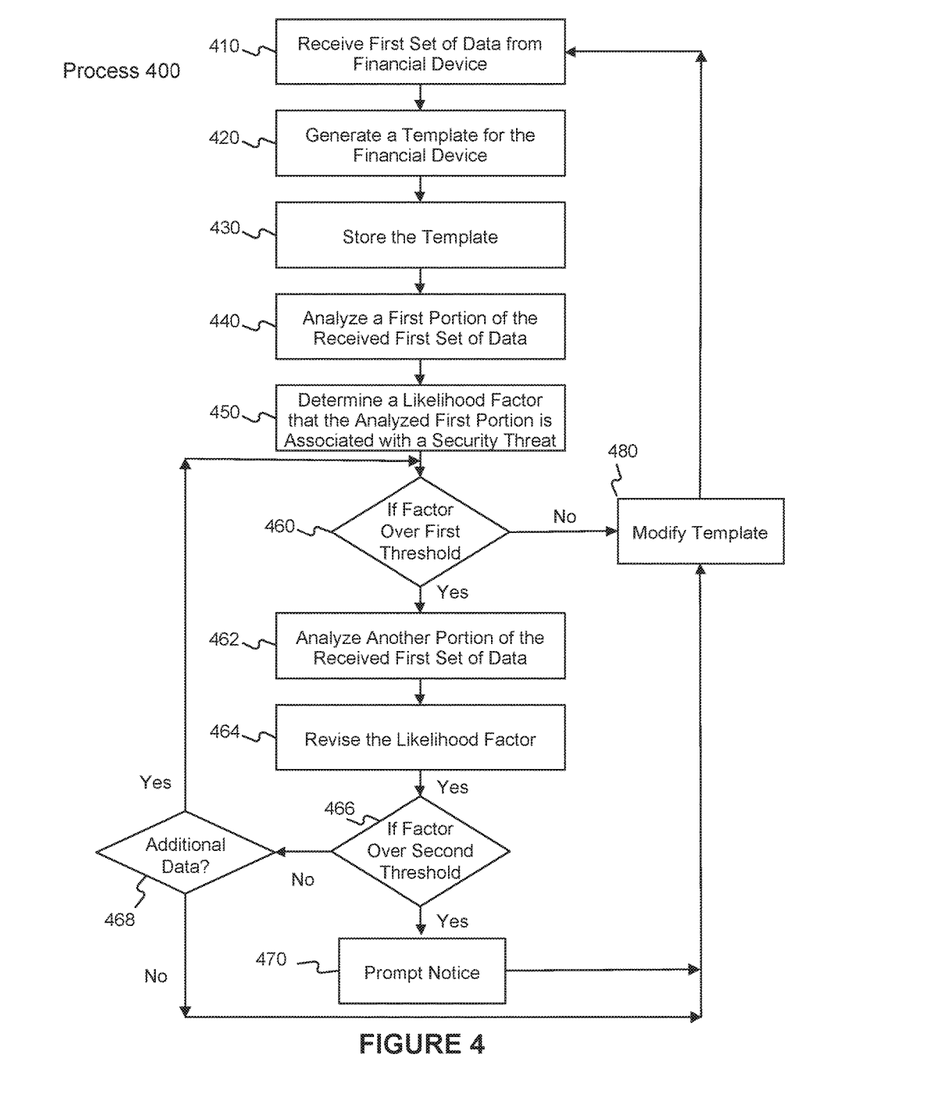
FIG. 4 is a flowchart of an exemplary process for enhancing ATM security surveillance.
Figure 5:
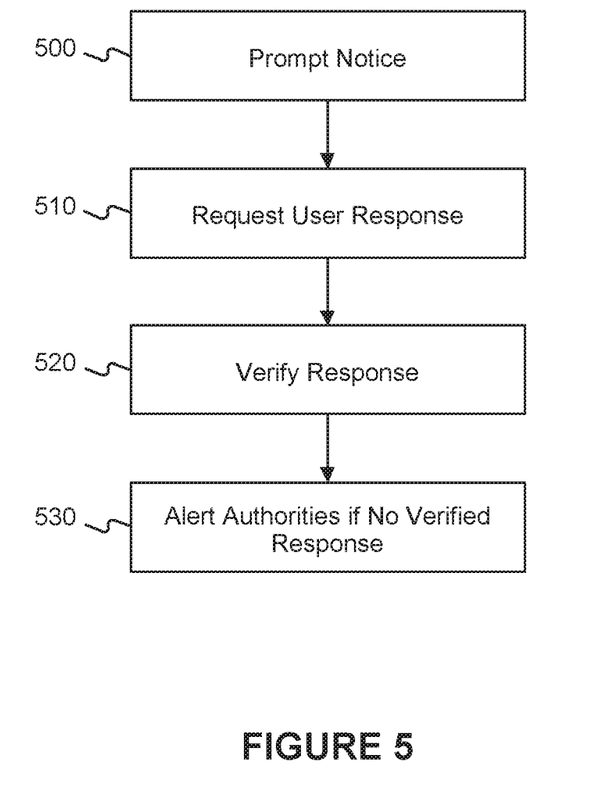
FIG. 5 is a flowchart of another exemplary process for enhancing ATM security surveillance.

In certain embodiments, memory 146 may store software executable by processor 142 to perform methods, such as the methods represented by the flowcharts depicted in FIGS. 4-5 and/or the methods associated with user interface (e.g., display 122) discussed above with reference to FIG. 2. In one example, memory 146 may store program applications 147. Applications 147 stored in memory 146, and executed by processor 142, may include a financial service app that causes processor 142 to execute processes related to financial services provided to users including, but not limited to, processing fiat currency transactions, credit and debit card transactions, checking transactions, processing payments, checking account balances, authorizing identity of user, verifying transactions, updating the user account, and/or analyzing received input from I/O devices 144 and 124 including input data 110a-110e. Memory 146 may store template 149. In some examples, program applications 147 may be stored in an external storage device, such as a cloud server located on a network, and processor 142 may retrieve and execute the externally stored programs 147.

Processing center 140 may be used to store input data 148 relevant to examples described herein for system 100. One such example is the storage of input data 110a-110e received by device 120 from input/output devices 122 and sensors 136 (microphones, keyboards, touch screens, cameras, web cameras, mouse, biometric sensors, location based sensors, accelerometers, etc. discussed throughout here). Data 148 may contain any data discussed above relating to the communication of user-based inputs, as well as, surrounding device 120 environment detected inputs. In addition, data 148 may contain historical input data 110a-110e from previous encounters, such as audio recordings, video recordings, sentiment analysis, audio frequency analysis, audio patterns, audio triggers indicating distress, visual recognition analysis, infrared images, previous threat reports, biometric data, account data, typing pattern, finger pressure rates, reading rates, and/or typing error rates. The data 148 associated with particular user, device 120, or surrounding areas of device 120 may also contain template 149 data that continuously is updated with new analysis. Data 148 may also include a modeled determination, threshold, and analysis.

Processing center 140 may include at least one database 150. Database 150 may consist of a volatile or non-volatile, magnetic, semiconductor, tape, optical, removable, nonremovable, or other type of storage device or tangible (i.e., non-transitory) computer readable medium. For example, database 150 may include at least one of a hard drive, a flash drive, a memory, a Compact Disc (CD), a Digital Video Disc (DVD), or a Blu-Ray™ disc. Alternatively, Database 150 may be a Microsoft SQL databases, Share Point databases, Oracle™ databases, Sybase™ databases, or other relational databases Database 150 may store data, such as data 148 that may be used by processor 142 for performing methods and processes associated with disclosed examples. Data stored in database 150 may include any suitable data, such as information relating to a user, a device 120, information relating to surrounding detected actions, and information modeled threat assessment, and/or user account. Although shown as a separate unit in FIG. 3, it is understood that database 150 may be part of memory 146, or an external storage device located outside of system 100. At least one of memory 146, and/or database 150 may store data and instructions used to perform one or more features of the disclosed examples. At least one of memory 146, and/or database 150 may also include any combination of one or more databases controlled by memory controller devices (e.g., server(s), etc.) or software, such as document management systems, Microsoft SQL databases, Share Point databases, Oracle™ databases, Sybase™ databases, or other relational databases. Processing center 140 may also be communicatively connected to one or more remote memory devices (e.g., databases (not shown)) through a network. The remote memory devices may be configured to store information and may be accessed and/or managed by system 100. Systems and methods consistent with disclosed examples, however, are not limited to separate databases or even to the use of a database.

The components of processing center 140 may be implemented as a device in hardware, software, or a combination of both hardware and software, as will be apparent to those skilled in the art. For example, although one or more components of processing center 140 may be implemented as computer processing instructions, all or a portion of the functionality of processing enter 140 may be implemented instead in dedicated electronics hardware.

Processing center 140 also stores template 149. Template 149 may include characteristics associated with device 120 and/or an environment surrounding device 120. For example, template 149 may include notes on potential dangers to device 120, including prior analyses of received input data 110a-110e. Additionally, for example, template 149 may include notes on potential non-dangers and false positives. For instance, if previous received input data 110a-110e consistently indicates that device 120 is located in the vicinity of a fire hazard (e.g., the fire department is consistently called at a neighboring building), template 149 may include notes regarding, for example, a frequency with which the fire department arrives in the vicinity of device 120. Alternatively, for example, if device 120 is located in the vicinity of a hospital then template 149 may include this information so that the danger analysis factors in the potential for frequent ambulances traveling in the vicinity of device 120. Template 149 may be consistently updated with new received input data 110a-110e to refine its notes with additional context. Template 149 may provide an initial set of data to compare received input data 110a-110e against. Template 149 may improve system 100 by providing additional data to build a pattern of analysis and recognition (e.g., commonly determined sentient and facial recognition), thereby improving system 100 and associate memory speed.

Through processor(s) 142, processing center 140 runs application 147 by performing methods and processes associated with disclosed examples described more fully below. Application 147 may analyze received input data 110a-110e for device 120 including, but not limited to, username/password; audio recordings, video recordings, sentiment analysis, audio frequency analysis, audio patterns, audio triggers indicating distress, visual recognition analysis, infrared images, previous threat reports, biometric data, account data, typing pattern, finger pressure rates, reading rates, and/or typing error rates; the device 120 information like type of device, device operating system, device serial number, device location, type of connection; data obtained from sensors 136 or location based data; historical data stored in memory 128 (and/or memory 146); as well as any analysis conducted or modeled by application 147. In some examples, application 147 may be stored in an external storage device, such as a cloud server located on a network and, and processor 142 may execute the application 147 remotely.

FIG. 4 is a flowchart of an exemplary process 400 performed by system 100. For example, process 400 may be include a method for enhancing ATM security surveillance, and, utilizing, analyzing, and modeling information collected (i.e. input data 110a-110e) from device 120. The process may include a step 410 of receiving a first set of data from device 120. In step 410, device 120 may provide an initial first set of input data 110a-110e to the processing center 140. As previously discussed, device 120 may be associated with a financial service provider, a bank, or any entity that associates user accounts with their customers. As such, device 120 may initially acquire the first set of input data 110a-110e from any of the discussed I/O 124 devices or sensors 136 discussed herein. In step 410, a user may provide the device 120 with the initial input data 110a-110e while using device 120. Alternatively, in step 410, the device 120 may receive the initial input data 110a-110e through other means, such as, from sensors 136 associated with device 120.

At step 420, processing center 140 may generate a template for the respective device 120. This initial template may be based on the received initial input data 110a-110e. During step 420, processing center 140 may create a base line of received input data 110a-110e, at a given initial time, for future comparison. Additionally, processing center 140 further may associate the received input data 110a-110e from device 120 with its GPS coordinates.

System 100 may store, at step 430, the received input data 110a-110e and the generated template at processing center 140.

At step 440, the received the initial input 110a-110e, may be portioned into at least two parts, a first portion and a second portion, where the first portion is analyzed by application 147 and machine learning techniques discussed above. The second portion may be stored in processing center 140. Additionally, at step 440, application 147 may, through sentiment analysis, determine if the received input data 110a-110e contains triggers that may constitute signs of danger. For example, application 147 may detect audio files of voice and recognize several factors indicating distress in a user's voice. Alternatively, application 147 may detect the audio frequency of a gunshot or first responder sirens. Application 147, at step 440, may also detect triggers in the audio files indicating car or building alarms. For instance, at step 440, application 147 may further detect certain words from audio inputs that are triggered as signs of danger, such as "help!" "help!"; "someone call 911"; etc. Another trigger for application 147 may consist of the context and tone of words within an audio file to determine if a user is actually in danger or merely saying a potentially danger-triggering word. Alternatively, application 147 may detect triggers within video files that are determined to be associated with signs of danger, such as a bright flash spark, or a raging fire.

Or application 147 may utilize facial recognition to identify a criminally wanted assailant. Alternatively, application 147 may detect infrared input that indicates excessive heat or freezing temperatures. Application 147 may detect potentially dangerous triggers for both the user and the device 120 surrounding area. For instance, the device 120 pressure sensors may activate indicating to application 147 that the device 120 is being broken into. A person having ordinary skill in this art would understand that the inputs discussed above are exemplary and that application 147 may utilize various factors in determining potentially-dangerous triggers based on the various inputs and sensor data.

At step 450, the system 100 may compare the received first set of data from device 120 (step 410) with a pre-defined base line of security and danger alerts. Further based on the comparison, system 100 may determine a likelihood factor that the analyzed (step 440) received input data 110a-110e is above a set threshold. For instance, by sorting previous input data 110a-110e through weighted variables (e.g., frequency of sirens, size of flame, noted sentiment distress, etc.), the danger analysis may determine that the likelihood of danger is significant and associate a high factor. The likelihood factor determination may weight different input data 110a-100e differently to prioritize likely dangerous events (e.g., audio clips of shouts for help). Based on the determined likelihood factor, the monitoring center 140 may determine that there is a security threat at the device 120. In one embodiment, system 100, at step 450, may further determine that the user at device 120 is in danger, or alternatively, system 100 may further determine that the device 120 itself is in danger, or alternatively, system 100 may determine that the surrounding area by device 120 is dangerous. Further, at step 450, the system 100 may determine the likelihood that there is danger near the device 120 within a confidence interval. For instance, after analyzing input data 110a-100e, system 100 may determine that certain audio files express distress (e.g., a user's voice is frightful), yet the sentiment analysis may not be entirely certain that the detected fear suggests a danger event. Thus, system 100 may further determine, a confidence interval reflecting a certainty or probability that the analyzed input data 110a-110e indicates danger to device 120. System 100 may determine the likelihood that device 120 may be subject to danger based on the determined confidence interval.

At step 460, system 100 may compare the likelihood factor determined in step 450 against a pre-determined threshold. If it is determined that the analyzed data (step 440) and determined likelihood factor (step 450) are not above the pre-determined threshold, then, at step 460, processing center 140 may proceed to step 460, modifying the template 149 by updating template 149 with the new analysis and likelihood factor determination, and then repeating step 410 with analyzing new received input data 110a-110e. Alternatively, if it is determined that the analyzed data (step 440) and determined factor (step 450) are above the pre-determined threshold, then, at step 460, processing center 140 may analyze, at step 462, the second portion (step 440) of received first set of input data 110a-110e (step 410).

Much like step 440, at step 462, the system 100 may analyze the second portion of the received first set of input data 110a-110e. Step 462 may undergo the same analysis as step 440, via application 147, and search for additional danger triggers in the second portion of the received first set of input data. Then at step 464 system 100 may modify the step 450 determined likelihood factor with the combination of analysis from steps 440 and 462.

At step 466, like step 460, system 100 may compare the revised likelihood factor determined in step 464 against a second pre-determined threshold which is higher than the first threshold. If it is determined that the revised determined likelihood factor (step 464) is not above the second pre-determined threshold, then, at step 466, the system 100 may proceed to step 468 and determine if there is a third portion of the received first set of input data 110a-110e. Alternatively, if it is determined that the revised determined likelihood factor (step 464) is above the pre-determined second threshold, then at step 470, the processing center 140 may provide prompt notice. At step 470 a prompt notice includes either notifying the user and/or users surrounding device 120 that a danger exists or that authorities have been notified, or the prompt notice by transmitted from processing center 140 directly to authority 160. For instance, notice to the user may include a phone call, email, text, warning sign, flashing lights, sirens, or an audio clip. Similarly, notice to authority 160 may include a phone call, email, text, warning sign, flashing lights, sirens, or an audio clip. Additionally, in step 470, system 100 may be configured to transmit a signal to wake up an otherwise dormant or inactive user device or device associated with authority 160. Further, system 100 may be configured to provide the prompt notice to the user or authority 160 after waking up the device associated with the user or with authority 160. System 100 may be configured to further improve the accuracy and speed of machine-learning analysis, as well as, improve the response time of first responders in the case of determined danger by referencing template 130.

First, at step 468, if system 100 determines there is a third portion of the received first set of input data 110a-110e then system 100 may repeat step 460 and may incorporate the third set portion of data into steps 460, 462, and 464. Otherwise, system 100 may proceed to step 460 by modifying the template.

Second, at step 466, if it is determined that the revised likelihood factor is above the second pre-determined threshold, then system 100 may provide a prompt notice at step 470. device 120.

At step 480, system 100 may modify template 149 generated at step 420. System 100 may store in template 149 all the received data portions from step 410, 440, 462, and 468; as well as, all the analysis and threshold determinations from steps 440-468. Modified template from step 480 may replace stored template for device 120 at step 430. System 100 may then begin the process again of receiving new input data 110a-110e for threat analysis.

FIG. 5 is a flowchart of an exemplary process for providing notice to device 120 user upon determination that a threat is detected at device 120. For instance, at step 500, system 100 already determined a threat is present (see steps 410-450 of FIG. 4). At step 510, processing center 140 may instruct device 120 to request a user response. The response request is designed to prompt a confirmation whether the user is safe or unsafe. Additionally, device 120 may receive the response in any input format discussed herein (i.e. audio, visual, etc.).

At step 520, application 147 further analyzes the response received at step 510 from device 120. Much like FIG. 4, at step 520, application 147 may utilize machine learning techniques and sentiment analysis to determine whether the user verified they were safe or still in distress.

At step 530, processing center 140 may alert the authorities 160 if it is unable to verify the safety of the user.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A method for enhancing ATM security surveillance, comprising:
   receiving a first set of data from a financial device;
   generating a template for the financial device, the template comprising the received first set of data;
   storing the template;
   generating a first analysis by analyzing a first portion of the received first set of data;
   determining a first likelihood factor that the analyzed first portion is associated with a physical security threat to the area surrounding the financial device, wherein when the first likelihood factor is above a first threshold:
   generating a second analysis by analyzing a second portion of the received first set of data, and
   revising the first likelihood factor based on the second analysis;
   generating a first notice if the first likelihood factor exceeds a second threshold;
   updating the template with the first analysis and the first likelihood factor;
   receiving a second set of data from the financial device; and
   updating the template with the second set of data.

2. The method of claim 1, further comprising storing the received first and second sets of data.

3. The method of claim 1, wherein the first set of data comprises at least one of audio or video data.

4. The method of claim 1, further comprising:
   generating a third analysis by analyzing a first portion of the received second set of data;
   determining a second likelihood factor that the third analysis is associated with a security threat, wherein if the second likelihood factor is above the first threshold:
   generating a fourth analysis by analyzing a second portion of the received second set of data, and
   revising the second likelihood factor based on the fourth analysis;
   generating a second notice once the second likelihood factor exceeds the second threshold; and
   updating the template with the fourth analysis and second likelihood factor.

5. The method of claim 4, wherein the method further comprises storing a plurality of templates, for a plurality of financial devices.

6. The method of claim 5, further comprising:
   generating a fifth analysis by analyzing the stored plurality of sets of data;
   determining a plurality of first likelihood factors associated with the stored plurality of sets of data; and
   updating the plurality of templates based on the fifth analysis and the plurality of first likelihood factors.

7. The method of claim 1 further comprising transmitting the notice to security party.

8. A system for enhancing ATM security surveillance, comprising:
   one or more memory devices storing instructions; and
   one or more processors configured to execute the instructions to perform operations comprising:
   receiving a first set of data from a financial device;
   generating a template for the financial device, the template comprising the received first set of data;
   storing the template;
   generating a first analysis by analyzing a first portion of the received first set of data;
   determining a first likelihood factor that the analyzed first portion is associated with a physical security threat to the area surrounding the financial device, wherein when the first likelihood factor is above a first threshold:
   generating a second analysis by analyzing a second portion of the received first set of data, and revising the first likelihood factor based on the second analysis;
   generating a notice if the first likelihood factor exceeds a second threshold;
   updating the template with the first analysis and the first likelihood factor;
   receiving a second set of data from the financial device; and
   updating the template with the second set of data.

9. The system of claim 8, further comprising storing the received first and second sets of data.

10. The system of claim 8, wherein the first set of data includes at least one of audio or video data.

11. The system of claim 8, further comprising:
    generating a third analysis by analyzing a first portion of the received second set of data;
    determining a second likelihood factor that the third analysis is associated with a security threat, wherein if the second likelihood factor is above the first threshold:
    generating a fourth analysis by analyzing a second portion of the received second set of data, and
    revising the second likelihood factor based on the fourth analysis;
    generating a second notice once the second likelihood factor exceeds the second threshold; and
    updating the template with the fourth analysis and second likelihood factor.

12. The system of claim 11, wherein the system further comprises storing a plurality of templates, for a plurality of financial devices.

13. The system of claim 12, further comprising:
    generating a fifth analysis by analyzing the stored plurality of sets of data;
    determining a plurality of first likelihood factors associated with the stored plurality of sets of data; and
    updating the plurality of templates based on the fifth analysis and the plurality of first likelihood factors.

14. The system of claim 8 further comprising transmitting the notice to security party.

15. A financial device for enhancing ATM security surveillance, comprising:

one or more memory devices storing instructions; and one or more processors configured to execute the instructions to perform operations comprising:

receiving a first set of data from a monitoring sensor;

generating a template for the financial device, the template comprising the received first set of data;

storing the template;

generating a first analysis by analyzing a first portion of the received first set of data;

determining a first likelihood factor that the analyzed first portion is associated with a physical security threat to the area surrounding the financial device, wherein when the first likelihood factor is above a first threshold:

generating a second analysis by analyzing a second portion of the received first set of data, and revising the first likelihood factor based on the second analysis;

generating a first notice if the first likelihood factor exceeds a second threshold;

updating the template with the first analysis and the first likelihood factor;

receiving a second set of data from the monitoring sensor; and updating the template with the second set of data.

16. The device of claim 15, further comprising storing the received first and second sets of data.

17. The device of claim 15, wherein the first set of data includes audio and video data.

18. The device of claim 15, further comprising:

generating a third analysis by analyzing a first portion of the received second set of data;

determining a second likelihood factor that the third analysis is associated with a security threat, wherein if the second likelihood factor is above the first threshold:

generating a fourth analysis by analyzing a second portion of the received second set of data, and revising the second likelihood factor based on the fourth analysis;

generating a second notice once the second likelihood factor exceeds the second threshold; and updating the template with the fourth analysis and second likelihood factor.

19. The device of claim 15, further comprising transmitting the notice to security party.

20. The device of claim 19, further comprising alerting a user of the notice.

* * * * *